United States Patent
Kim et al.

(10) Patent No.: US 7,034,267 B2
(45) Date of Patent: Apr. 25, 2006

(54) DC VOLTAGE MICROWAVE OVEN POWER SUPPLYING CIRCUIT

(75) Inventors: Wan Soo Kim, Kwangmyong-shi (KR); Sung Jin Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/043,148

(22) Filed: Jan. 27, 2005

(65) Prior Publication Data
US 2005/0121443 A1    Jun. 9, 2005

Related U.S. Application Data

(62) Division of application No. 10/406,254, filed on Apr. 4, 2003, now abandoned.

(30) Foreign Application Priority Data
Apr. 4, 2002 (KR) .............................. P2002-18619

(51) Int. Cl.
*H05B 6/68* (2006.01)

(52) U.S. Cl. ........................ 219/715; 219/702; 363/17; 363/98

(58) Field of Classification Search ........ 219/715–718, 219/702, 721; 363/17, 21, 98
See application file for complete search history.

(56) References Cited

U.S. PATENT DOCUMENTS

| | | | |
|---|---|---|---|
| 4,860,184 A | 8/1989 | Tabisz et al. | |
| 5,010,468 A | 4/1991 | Nilssen | |
| 5,115,168 A | 5/1992 | Shoda et al. | |
| 5,181,160 A | 1/1993 | Okamoto et al. | |
| 5,237,140 A | 8/1993 | Akazawa et al. | |
| 5,977,530 A | 11/1999 | Bessho et al. | |
| 6,097,614 A | 8/2000 | Jain et al. | |
| 6,362,463 B1 * | 3/2002 | Bessyo et al. | 219/715 |
| 6,483,724 B1 | 11/2002 | Blair et al. | |

FOREIGN PATENT DOCUMENTS

| | | |
|---|---|---|
| EP | 0 517 226 A1 | 12/1992 |
| EP | 0 589 263 A1 | 3/1994 |
| JP | 4-871185 | 3/1992 |
| WO | WO 01/24349 A1 | 4/2001 |

* cited by examiner

*Primary Examiner*—Philip H. Leung
(74) *Attorney, Agent, or Firm*—Birch Stewart Kolasch & Birch LLP

(57) ABSTRACT

Circuit for operating a microwave oven including a DC voltage source, a switching part having at least two switching devices electrically connected to the DC voltage source for switching a voltage from the DC voltage source, controlling part for controlling the switching part, a magnetron for generating a microwave, and a converting part for converting the voltage from the DC voltage source to a voltage for operating the magnetron by switching of the switching part, thereby permitting operation of the microwave oven by using a car battery.

10 Claims, 2 Drawing Sheets

DC VOLTAGE MICROWAVE OVEN POWER SUPPLYING CIRCUIT

This application is a Divisional of application Ser. No. 10/406,254, filed on Apr. 4, 2003 now abandoned, and for which priority is claimed under 35 U.S.C. § 120; and this application claims priority of Application No. P2002-18619 filed in Korea on Apr. 4, 2002 under 35 USC § 119; and the entire contents of all are hereby incorporated by reference.

BACKGROUND OF THE INVENTION

1. Field of the Invention

The present invention relates to a circuit for operating a microwave oven, and more particularly, to an inverter circuit which can operate a microwave oven by using a DC voltage.

2. Background of the Related Art

Recently, enhancement of an energy consumption efficiency and performance of most home appliances, such as electric rice cookers, air conditioners, refrigerators and the like, are sought by applying an inverter operating system thereto. It is because users' demand for home appliances that have a high energy consumption efficiency, an improved performance and convenience in use becomes the greater, as goods for convenience of life, such as the electric rice cookers, air conditioners, refrigerators and the like, are used the wider gradually.

Such an inverter operating system is applied to the microwave oven, too. The microwave oven heats an object by directing microwave generated from a current to the object. For generation of the microwave, an inverter operating system of control is employed.

FIG. 1 illustrates a related art circuit for operating a microwave oven.

Referring to FIG. 1, a related art inverter circuit for operating a microwave oven is provided with a rectifying circuit 15 for rectifying an AC current from an AC power source 10, which rectified current is provided to a primary side of a transformer through the inductor 20. There is a magnetron 40 on a secondary side of the transformer 25 for generating microwave. That is, the magnetron 40 is operative from the voltage induced at the secondary side of the transformer 25 for generating the microwave.

A primary side voltage of the transformer 25 is controlled by a power switching part 30. The power switching part 30 is turned on/off in response to a PWM control signal generated at an inverter operating part 55 based on an output control signal from the microcomputer 35, to control a primary supply voltage of the transformer 25.

A current to the magnetron 40 is detected at a current transformer 45, rectified at a rectifying circuit 50, and forwarded. A signal of a current intensity to the magnetron 40 detected at the current transformer 45 is provided to the microcomputer 35.

In the meantime, an anode of the magnetron 40 has no current, but a high voltage provided thereto from the transformer 25, until a heater in the magnetron 40 is heated enough to emit thermal electrons. This state is a non-oscillation region of the magnetron 40, and it takes a certain time period (about 2 seconds) until the heater in the magnetron 40 makes a regular emission of the thermal electrons enough to generate the microwave.

That is, only after the regular oscillation of the magnetron 40 is made by the heater, the current flow to the anode of the magnetron 40 starts. This current is called as an anode current, and a product of the anode current and an anode voltage is a power P provided to the magnetron 40. A product of the power P to an efficiency of the magnetron 40 represents an intensity of the microwave from the magnetron 40.

Therefore, the current intensity to the magnetron 40 is in correspondence to a microwave output, such that if the current intensity is high, the microwave output is high, and if the current intensity is low, the microwave output is low.

That is, the current intensity detected at the current transformer 45 is used for controlling the microwave output, as the current intensity is provided to the microcomputer 35 to control the current intensity to the magnetron 40.

However, the related art circuit for operating a microwave oven has the following problems.

Because the related art microwave oven is only operative on an utility AC power, operation of the magnetron in outdoor without the utility AC power is not possible, and operation of the magnetron is also not possible in a black out.

SUMMARY OF THE INVENTION

Accordingly, the present invention is directed to a circuit for operating a microwave oven that substantially obviates one or more of the problems due to limitations and disadvantages of the related art.

An object of the present invention is to provide a circuit for operating a microwave oven in which the microwave oven is controlled by using a DC power such as a power source for a car.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the circuit for operating a microwave oven includes a DC voltage source, a switching part having at least two switching devices electrically connected to the DC voltage source for switching a voltage from the DC voltage source, a controlling part for controlling the switching part, a magnetron for generating a microwave, and a converting part for converting the voltage from the DC voltage source to a voltage for operating the magnetron by switching of the switching part.

The DC voltage source is a car battery source.

The switching part includes two or four switching devices. The switching device includes a bipolar transistor and a diode connected in parallel to each other. The switching devices each having the bipolar transistor and the diode are connected in parallel.

The switching device includes an MOSFET, a diode and a capacitor connected in parallel.

The switching devices each having the MOSFET, the diode and the capacitor form a serial resonant half-wave voltage doubler rectifier circuit or a serial resonant full wave rectifier circuit.

In another aspect of the present invention, there is provided a circuit for operating a microwave oven including a DC voltage source, a first switching device connected to the DC voltage source in series for switching a voltage from the DC voltage source, a second switching device connected to the first switching device in parallel for switching the voltage from the DC voltage source, a controlling part for controlling the first, and second switching devices, a magnetron for generating a microwave, and a converting part connected between the DC voltage source and a node between the first and second switching devices for converting the voltage from the DC voltage source to a voltage for operating the magnetron by switching of the first and second switching devices.

Each of the first, and second switching devices includes a bipolar transistor and a diode connected in parallel to each other.

In further aspect of the present invention, there is provided a circuit for operating a microwave oven including a DC voltage source, first and second switching devices connected to the DC voltage source in series for switching a voltage from the DC voltage source, a controlling part for controlling the first, and second switching devices, a magnetron for generating a microwave, and a converting part connected between the DC voltage source and a node between the first and second switching devices for converting the voltage from the DC voltage source to a voltage for operating the magnetron by switching of the first and second switching devices.

Each of the first, and second switching devices includes an MOSFET, a diode and a capacitor connected in parallel to one another.

In still further aspect of the present invention, there is provided a circuit for operating a microwave oven including a DC voltage source, first and second switching devices connected to the DC voltage source in series for switching a voltage from the DC voltage source, third and fourth switching devices connected to the first and second switching devices in parallel for switching the voltage from the DC voltage source, a controlling part for controlling the first, second, third and fourth switching devices, a magnetron for generating a microwave, and a converting part connected between a first node between the first and second switching device and a second node between the third and fourth switching devices for converting the voltage from the DC voltage source to a voltage for operating the magnetron by switching of the first, second, third and fourth switching devices.

Each of the first, second, third and fourth switching devices includes an MOSFET, a diode and a capacitor connected in parallel to one another.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
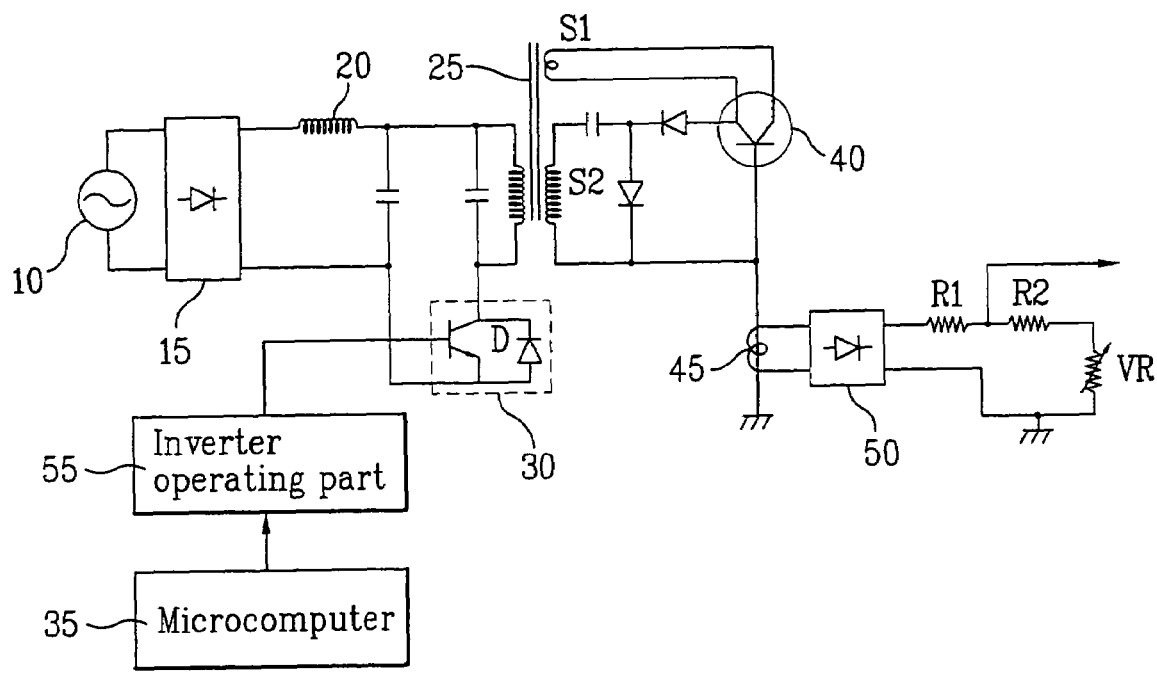
FIG. 1 illustrates a circuit diagram for describing a related art circuit for operating a microwave oven.
Figure 2:
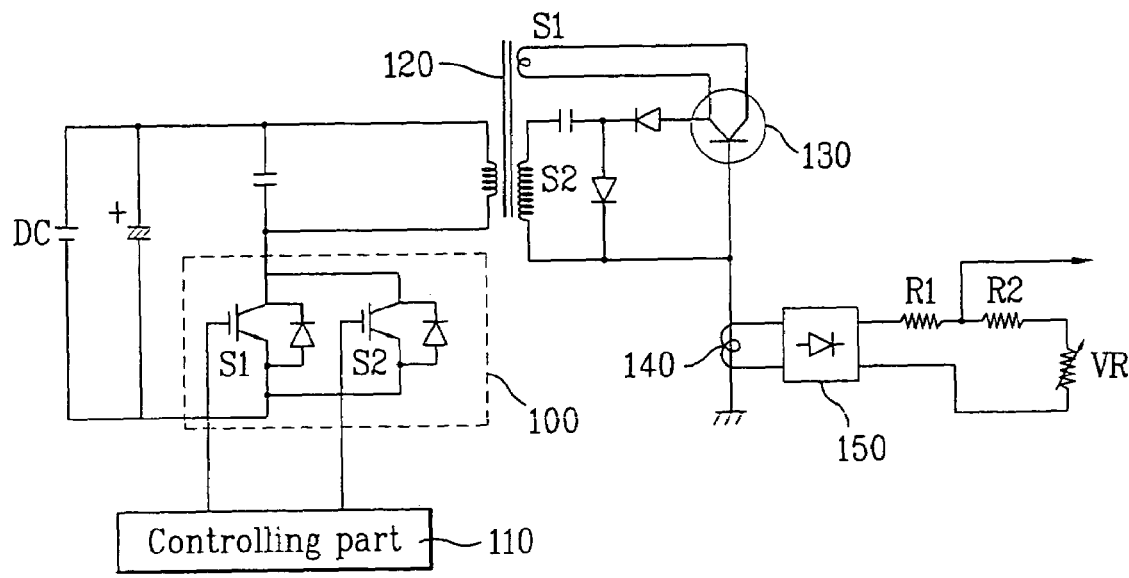
FIGS. 2 to 4 illustrate circuit diagrams each for describing a circuit for operating a microwave oven in accordance with one of different preferred embodiments of the present invention.
Figure 3:
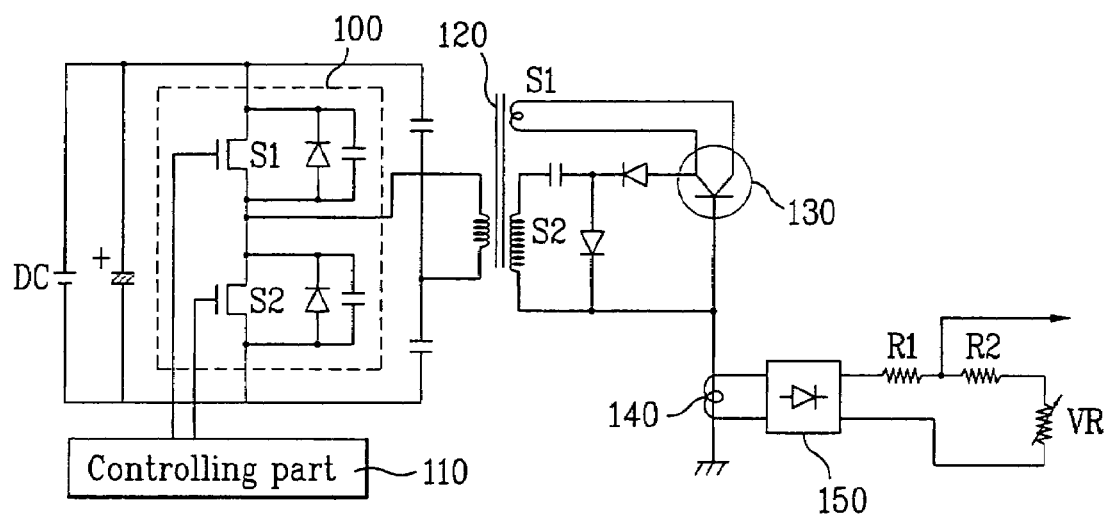
Figure 4:
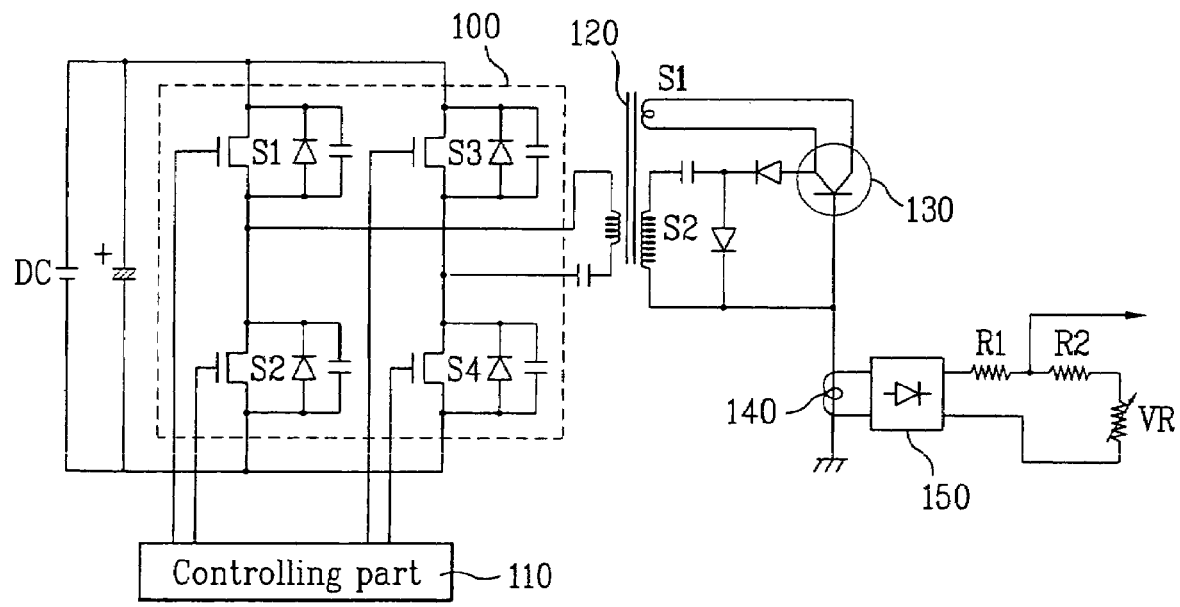

Reference will now be made in detail to the preferred embodiments of the present invention, examples of which are illustrated in the accompanying drawings. FIGS. 2 to 4 illustrate circuit diagrams each for describing a circuit for operating a microwave oven in accordance with one of different preferred embodiments of the present invention.

Referring to FIG. 2, the circuit for operating a microwave oven in accordance with a preferred embodiment of the present invention is provided with a DC voltage source DC, for an example, a car battery which is used widely, for cooking food in outdoor by using the microwave oven.

The circuit for operating a microwave oven in accordance with a preferred embodiment of the present invention includes a switching part 100 having at least two electrically connected switching devices S1 and S2 for switching a voltage from the DC voltage source DC, a controlling part 110 for controlling the switching devices S1 and S2, a magnetron 130 for generating a microwave, a converting part 120 for converting the voltage into a voltage for operating the magnetron 130 by turning on/off of the switching part 100.

That is, the embodiment shown in FIG. 2 includes the DC voltage source DC, the first switching device S1 connected to the DC voltage source in series for switching the voltage of the DC voltage source, the second switching device S2 connected to the first switching device S1 in parallel for switching the voltage of the DC voltage source, the controlling part 110 for controlling the first and second switching devices S1 and S2, the magnetron 130 for generating the microwave, and the converting part 120 connected to the DC voltage source and a node between the first and second switching devices S1 and S2 for converting the voltage from the DC voltage source to a voltage which can operate the magnetron according to switching of the first and second switching devices S1 and S2.

The first and second switching devices S1 and S2 are a bipolar transistor and a diode respectively connected in parallel.

The converting part 120, a transformer, is connected to the anode of the DC voltage source.

Though not shown, the controlling part 110 includes an inverter operating part and a microcomputer, so that the switching devices S1 and S2 are turned on/off in response to control signals provided from the inverter operating part based on an output control signal from the microcomputer, for controlling the primary side supply voltage of the converter 120.

The operation will be described in more detail. The DC voltage source voltage DC is made to be provided to the primary side of the converting part 120 as a pulsating voltage through the rectifying circuit (not shown). The pulsating voltage is turned into an alternating voltage by switching of the switching part 100 before being provided to the primary side of the converting part 120. Since an intensity of the current i switched is as high as about 139 A, the present invention formulates the switching part 100 with the two switching devices.

Accordingly, the secondary side of the converting part 120 is converted into a voltage range enough to operate the magnetron 130 in proportion of a number of windings, and to make the magnetron 130 to generate the microwave.

The current to the magnetron 130 is detected by the current transformer 140, and the detected current is converted through the rectifying circuit 150 before being forwarded. A signal of an intensity of the current to the magnetron 130 detected at the current transformer 140 is provided to the microcomputer in the controlling part 110.

As described before, the current intensity detected at the current transformer 140 is provided to the microcomputer for controlling the current intensity to the magnetron, to control microwave output.

Since the present invention operative thus can operate a microwave oven by using a power source, such as a car battery, food can be cooked even in outdoor conveniently.

Next, FIG. 3 illustrates a circuit diagram for describing another preferred embodiment of the present invention, wherein parts the same with FIG. 2 will be represented with the same reference symbols.

Referring to FIG. 3, the two switching devices S1 and S2 of the switching part 100 are provided in serial resonant half-wave rectification circuits each inclusive of an MOSFET transistor, a diode, and a capacitor connected in parallel.

That is, the embodiment in FIG. 3 includes the DC voltage source DC, first, and second switching devices S1 and S2 connected to the DC voltage source in series for switching a voltage provided from the DC voltage source, a controlling part 110 for controlling the first and second switching devices S1 and S2, a magnetron 130 for generating a microwave, and a converting part 120 connected to the DC voltage source and a node between the first and second switching devices S1 and S2 for converting the voltage from the DC voltage source to a voltage which can operate the magnetron according to switching of the first and second switching devices S1 and S2.

Each of the first and second switching devices S1 and S2 includes an MOSFET transistor, a diode, and a capacitor connected in parallel. The converting part 120 connected to the DC voltage source is connected to a cathode of the DC voltage source.

Since the embodiment of FIG. 3 has a current to the switching device S1 or S2 as high as approx. 118 A, the MOSFET transistor is employed, which has excellent current handling capability and switching speed.

Upon subjecting a voltage of approx. 2 KV, a secondary voltage of the converting part 120 provided by switching of the switching devices, to a half-wave voltage doubler rectification and application to the magnetron 130, a microwave energy is produced, to cook the food.

FIG. 4 illustrates a circuit diagram for describing a circuit for operating a microwave oven in accordance with another preferred embodiment of the present invention.

Referring to FIG. 4, four switching devices S1~S4 of the switching part 100 are provided in serial resonant full wave rectifier circuits.

That is, the embodiment in FIG. 4 includes the DC voltage source DC, first, and second switching devices S1 and S2 connected to the DC voltage source in series for switching a voltage provided from the DC voltage source, third, and fourth switching devices S3 and S4 connected to first, and second switching devices S1 and S2 in parallel for switching a voltage provided from the DC voltage source, a controlling part 110 for respectively controlling the first second, third and fourth switching devices S1, S2, S3 and S4, a magnetron 130 for generating a microwave, and a converting part 120 connected to a first node between the first and second switching devices S1 and S2 and a second node between the third and fourth switching devices S3 and S4 for converting the voltage from the DC voltage source to a voltage which can operate the magnetron according to switching of the first, second, third, and fourth switching devices S1, S2, S3 and S4.

Each of first, second, third, and fourth switching devices S1, S2, S3 and S4 includes an MOSFET transistor, a diode and a capacitor connected in parallel.

Since the embodiment of FIG. 4 has a current to the switching device S1, S2, S3 or S4 as high as approx. 59 A, alike the case of FIG. 3, the MOSFET transistor is employed, which has excellent current handling capability and switching speed.

Upon subjecting a voltage of approx. 2 KV, a secondary voltage of the converting part 120 provided by switching of the switching devices, to a half-wave voltage doubler rectification and application to the magnetron 130, a microwave energy is produced, to cook the food.

As has been described, the circuit for operating a microwave oven of the present invention has the following advantages.

The operating circuit, which can generate a microwave energy from a magnetron by using DC power source, such as car battery which is used widely, permits convenient outdoor cooking of food as well as convenient cooking of food in a black out, by using a car battery.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A circuit for operating a microwave oven comprising:
a DC voltage source;
a first capacitor and a second capacitor connected in series, a combination of the first capacitor and a second capacitor being connected to the DC voltage source in parallel, a first node being between the first capacitor and the second capacitor in the combination of the first capacitor and the second capacitor;
a switching part having a first and a second switching devices electrically connected to the DC voltage for switching a voltage from the DC voltage source, the first switching device and the second switching device being connected in series;
a controlling part for controlling the first, and second switching devices;
a magnetron for generating a microwave; and
a converting part for converting the voltage from the DC voltage source to a voltage for operating the magnetron, the converting part having a first terminal and a second terminal, the first terminal being connected to a second node connecting both of the first and second switching devices, the second terminal being connected to the first node, the second terminal and the first node having a substantially equal electric potential, the second terminal being connected to an anode of the DC voltage source via the first capacitor and connected to a cathode of the DC voltage source via the second capacitor.

2. The circuit as claimed in claim 1, wherein the DC voltage source is a car battery source.

3. The circuit as claimed in claim 1, wherein each of the first and second switching devices includes an MOSFET, a diode and a capacitor connected in parallel.

4. The circuit as claimed in claim 3, wherein each of the first and second switching devices includes one of a serial resonant half-wave voltage doubler rectifier circuit and a serial resonant full wave rectifier circuit.

5. The circuit as claimed in claim 1, wherein the converting part is a transformer.

6. A circuit for operating a microwave oven comprising:
a DC voltage source having an anode and a cathode;
a first capacitor and a second capacitor connected in series, a combination of the first capacitor and a second capacitor being connected to the DC voltage source in parallel, a node being between the first capacitor and the second capacitor in the combination of the first capacitor and the second capacitor;
a switching part having at least a first and a second switching devices electrically connected to the DC voltage source for switching a voltage from the DC voltage source, the first switching device having a first terminal and a second terminal, the second switching device having a third terminal and a fourth terminal, the second terminal and the third terminal being connected, the first terminal being connected to the anode of the DC voltage source, the fourth terminal being connected to the cathode of the DC voltage source;
a controlling part for controlling the switching part;
a magnetron for generating a microwave; and
a converting part for converting the voltage from the DC voltage source to a voltage for operating the magnetron, the converting part having a fifth terminal and a sixth terminal, the fifth terminal being connected to the second terminal and the third terminal, the sixth terminal being connected to the node, the sixth terminal and the node having a substantially equal electric potential, the sixth terminal being connected to the anode of the DC voltage source via the first capacitor and connected to the cathode of the DC voltage source via the second capacitor.

7. The circuit as claimed in claim 6, wherein the DC voltage source is a car battery source.

8. The circuit as claimed in claim 6, wherein each of the first and the second switching devices includes an MOSFET, a diode and a capacitor connected in parallel.

9. The circuit as claimed in claim 8, wherein each of the first and second switching devices includes one of a serial resonant half-wave voltage doubler rectifier circuit and a serial resonant full wave rectifier circuit.

10. The circuit as claimed in claim 6, wherein the converting part is a transformer.

* * * * *